US012627369B2

(12) United States Patent
Li

(10) Patent No.: US 12,627,369 B2
(45) Date of Patent: May 12, 2026

(54) SATELLITE-BASED COMMUNICATION METHOD AND APPARATUS, AND STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 452 days.

(21) Appl. No.: 18/010,758

(22) PCT Filed: Jul. 3, 2020

(86) PCT No.: PCT/CN2020/100267
§ 371 (c)(1),
(2) Date: Dec. 15, 2022

(87) PCT Pub. No.: WO2022/000508
PCT Pub. Date: Jan. 6, 2022

(65) Prior Publication Data
US 2023/0239040 A1 Jul. 27, 2023

(51) Int. Cl.
*H04B 7/185* (2006.01)
(52) U.S. Cl.
CPC ................................ *H04B 7/18513* (2013.01)
(58) Field of Classification Search
CPC .................... H04B 7/185–195; H04B 7/18513
See application file for complete search history.

(56) References Cited

U.S. PATENT DOCUMENTS

| | | | | |
|---|---|---|---|---|
| 4,309,764 A | * | 1/1982 | Acampora | H04B 7/18513 370/324 |
| 7,020,462 B1 | * | 3/2006 | Wesel | H04B 7/2041 455/12.1 |
| 2010/0231448 A1 | * | 9/2010 | Harper | G01S 19/06 342/357.43 |
| 2016/0149599 A1 | * | 5/2016 | Lindsay | H04B 7/195 455/13.1 |
| 2019/0212408 A1 | * | 7/2019 | Lam | G01S 3/043 |
| 2019/0222330 A1 | * | 7/2019 | Shan | H04W 64/006 |
| 2020/0209377 A1 | * | 7/2020 | Ogura | G01S 13/08 |

FOREIGN PATENT DOCUMENTS

| | | |
|---|---|---|
| CN | 1156525 A | 8/1997 |
| CN | 110221318 A | 9/2019 |

OTHER PUBLICATIONS

PCT/CN2020/100267 English translation of International Search Report dated Mar. 12, 2021, 2 pages.

* cited by examiner

*Primary Examiner* — Raymond S Dean
(74) *Attorney, Agent, or Firm* — Cozen O'Connor

(57) ABSTRACT
A satellite-based communication method includes obtaining operation information of a first satellite and location information of a target coverage area; and determining parameters of an antenna of the first satellite according to the operation information of the first satellite and the location information of the target coverage area. The parameters are configured to control the antenna to provide beams directed to the target coverage area. A satellite-based communication apparatus and storage medium are also disclosed.

10 Claims, 5 Drawing Sheets

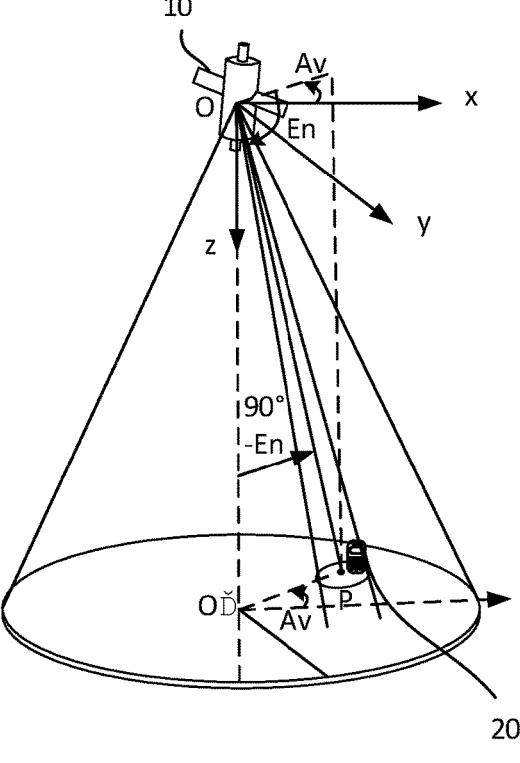

FIG. 1 obtaining operation information of a first satellite and location information of a target coverage area

201 determining parameters of an antenna of the first satellite according to the operation information of the first satellite and the location information of the target coverage area; in which the parameters are configured to control the antenna to provide beams directed to the target coverage area

202

Figure 3:
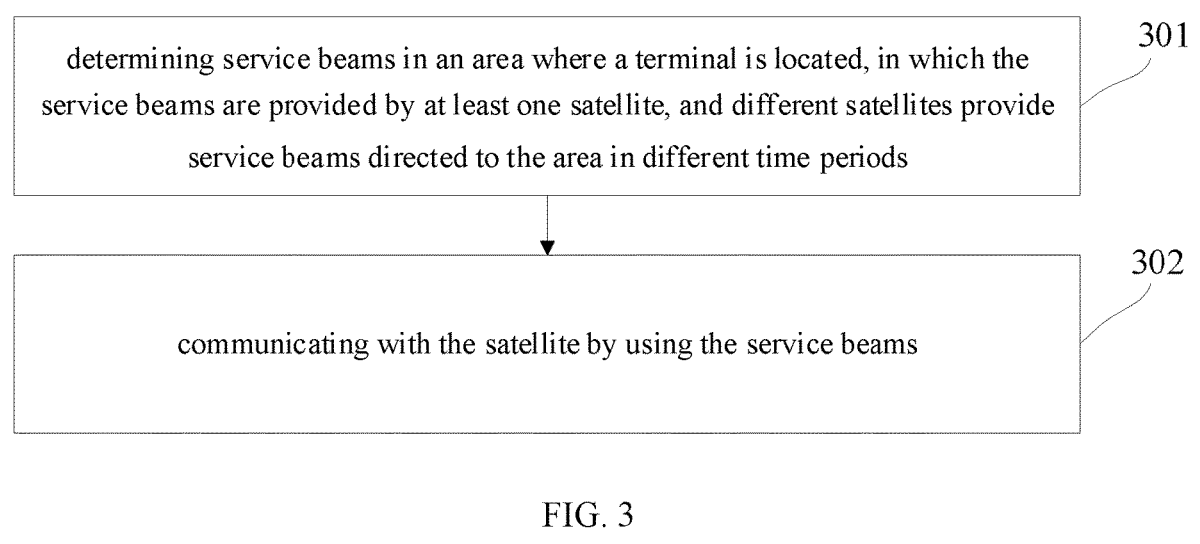

FIG. 2 determining service beams in an area where a terminal is located, in which the
service beams are provided by at least one satellite, and different satellites provide
service beams directed to the area in different time periods

301 communicating with the satellite by using the service beams

| first satellite | terminal |
|---|---| obtaining operation information of a first satellite and location information of a target coverage area — 401 determining a direction of arrival of a signal sent by a device on ground located in the target coverage area — 402 determining parameters of an antenna of the first satellite according to the operation information of the first satellite and the direction of arrival — 403 determining service beams in an area where a terminal is located — 404 communicating with the satellite by using the service beams — 405

FIG. 4

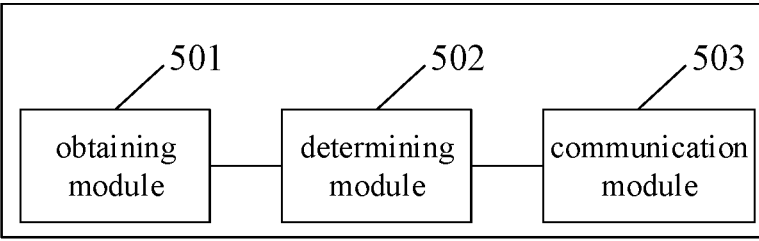

FIG. 5

SATELLITE-BASED COMMUNICATION METHOD AND APPARATUS, AND STORAGE MEDIUM

CROSS-REFERENCE TO RELATED APPLICATION

The present application is a U.S. National Stage of International Application No. PCT/CN2020/100267, filed Jul. 3, 2020, the contents of all of which are incorporated herein by reference in their entireties for all purposes.

TECHNICAL FIELD

The present disclosure relates to a communication technology field, and more particularly to a satellite-based communication method, a satellite-based communication apparatus, and a storage medium.

BACKGROUND

With development of the satellite communication technology, it is possible to use satellites to provide communication services for aircrafts, ships, and remote areas where it may not be cost-effective or even possible to install terrestrial base stations and other communication equipment.

A non-synchronous orbit satellite moves relative to the ground, and has a changeable attitude with time. A coverage area of an antenna of the satellite on the ground will move and rotate with the movement of the satellite. Since a low-orbit satellite has a fast movement speed, a coverage range of an antenna on the ground changes quickly, such that a ground communication terminal needs to frequently switch access beams, or even fails to access the beams, which affects communication quality.

SUMMARY

Embodiments of the present disclosure provide a satellite-based communication method, a satellite-based communication apparatus, and a storage medium.

According to a first aspect of embodiments of the present disclosure, a satellite-based communication method is provided. The method includes obtaining operation information of a first satellite and location information of a target coverage area; and determining parameters of an antenna of the first satellite according to the operation information of the first satellite and the location information of the target coverage area. The parameters are configured to control the antenna to provide beams directed to the target coverage area.

According to a second aspect of embodiments of the present disclosure, a satellite-based communication method is provided. The method includes determining service beams in an area where a terminal is located, in which the service beams are provided by at least one satellite, and different satellites provide service beams directed to the area in different time periods; and communicating with the satellite by using the service beams.

According to a third aspect of embodiments of the present disclosure, a satellite-based communication apparatus is provided. The apparatus includes a processor; and a memory for storing instructions executable by the processor. The processor is configured to load and execute the instructions to perform the satellite-based communication method according to the first aspect or the second aspect.

According to a fourth aspect of embodiments of the present disclosure, a computer-readable storage medium is provided. The computer-readable storage medium has stored therein instructions that, when executed by a processor, cause the processor to perform the satellite-based communication method according to the first aspect or the second aspect.

It is to be understood that both the foregoing general description and the following detailed description are illustrative and explanatory only and are not intended to limit the embodiments of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a block diagram illustrating a satellite communication system according to an illustrative embodiment.

FIG. 2 is a flowchart illustrating a satellite-based communication method performed by a satellite according to an illustrative embodiment.

FIG. 3 is a flowchart illustrating a satellite-based communication method performed by a terminal according to an illustrative embodiment.

FIG. 4 is a flowchart illustrating a satellite-based communication method according to an illustrative embodiment.

FIG. 5 is a schematic diagram illustrating a satellite-based communication apparatus implementing a satellite according to an illustrative embodiment.

DETAILED DESCRIPTION

Figure 6:
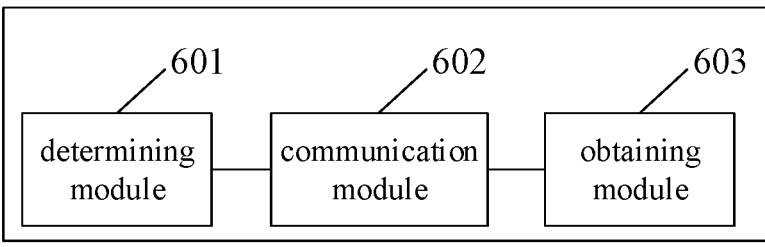
FIG. 6 is a schematic diagram illustrating a satellite-based communication apparatus implementing a satellite according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims, "a/an", "said" and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly second information may also be called first information. Depending on the context, the word "if" as used herein may be interpreted as "upon" or "when" or "in response to determining".

It could be understood that although steps are described with numbers in embodiments of the present disclosure for ease of understanding, these numbers do not represent an execution order of the steps, and do not mean that the steps numbered sequentially are executed together. It could be understood that one or more steps of a plurality of steps numbered sequentially may be executed independently to solve corresponding technical problems and achieve a predetermined technical solution. Even though the plurality of steps are exemplarily listed together in drawings, which does not mean that these steps are executed together. The drawings only exemplarily list these steps together for ease of understanding.

FIG. 1 is a block diagram illustrating a satellite communication system according to an illustrative embodiment. As shown in FIG. 1, the satellite communication system includes a satellite 10 and a terminal 20.

The satellite 10 is a non-geosynchronous orbit satellite, such as a low Earth orbit (LEO) satellite. The non-geosynchronous orbit satellites are deployed in non-geosynchronous orbits, and orbit the Earth in all paths on the Earth's surface at a relatively low altitude (e.g., an altitude lower than that of geostationary Earth orbit (GSO) satellites). At least one orbital plane may include one or more non-geosynchronous orbit satellites.

The non-geosynchronous orbit satellites are equipped with phased array antennas. The non-geosynchronous orbit satellites may be aligned to the ground to emit beams through the phased array antennas, such that the beams cover a certain area on the ground, and the terminals in the area may perform communication by using the beams.

The non-geosynchronous orbit satellites may adjust the direction of the beam through beamforming that is a signal preprocessing technology based on the antenna array. By adjusting a weighting coefficient of an array element in the antenna array, a spatially directional beam is generated, such that a main lobe of the antenna beam is aligned with a direction of arrival (DOA) of a user signal. A side lobe or null trap is aligned with a direction of arrival of an interference signal, so as to fully and efficiently utilize the mobile user signals and eliminate or suppress the interference signals.

The terminals 20 may be dispersed throughout the satellite communication system, and each terminal 20 may be stationary or mobile. The terminal 20 may be called by those skilled in the art a mobile station, a user station, a mobile unit, a user unit, a wireless unit, a remote unit, a mobile device, a user device, a wireless device, a wireless communication device, a remote device, a mobile user station, an access terminal, a mobile terminal, a wireless terminal, a remote terminal, a handheld device, a user agent, a mobile client, a client, or some other appropriate terms. The terminal 20 may be a cellular phone, a personal digital assistant (PDA), a wireless modem, a wireless communication device, a handheld device, a tablet computer, a laptop computer, a cordless phone, a wireless local loop (WLL)

station or the like. The terminal 20 may communicate with the satellite 10 in the satellite communication system.

The satellite 10 and the terminal 20 may communicate with each other through an air interface technology, for example, through a cellular technology. A communication link between the satellite 10 and the terminal 20 may include at least one of a downlink (DL) transmission from the satellite 10 to the terminal 20, or an uplink (UP) transmission from the terminal 20 to the satellite 10. The downlink transmission may also be called a forward link transmission, and the uplink transmission may also be called a reverse link transmission. In some embodiments, the downlink transmission may include transmissions for discovery signals that may include at least one of reference signals or synchronization signals.

The satellite communication system shown in FIG. 1 above may be a long term evolution (LTE) system, or a next generation evolution system based on the LTE system, such as an LTE-Advanced (LTE-A) system or a fifth generation (5G) system (also known as a NR system). The satellite communication system may be a next generation evolution system based on the 5G system, such as a beyond 5th generation (B5G) system, a 6th generation (6G) system or the like. In some embodiments, the terms "system" and "network" are generally used interchangeably, but those skilled in the art may understand their meanings.

The communication systems and business scenarios described in embodiments of the present disclosure are for more clearly illustrating the technical solutions of embodiments of the present disclosure, and do not constitute limitations on the technical solutions provided by embodiments of the present disclosure. With evolution of technologies and emergence of new business scenarios, the technical solutions provided by embodiments of the present disclosure may be applicable to similar technical problems.

In some embodiments, the target coverage area is an area where a ground communication network does not cover, for example, air, sea islands, sea areas and so on. With miniaturization and mass production of the satellites and continuous maturity of rocket launch technologies, cost of satellite deployment is significantly lower. Through covering these areas with the satellites, it is possible to reduce construction cost of the communication networks.

In some embodiments, assuming that a point where the satellite is located is point S, and a directing point of a beam center of the beam emitted by the satellite antenna is point E, the coverage area of the beam emitted by the satellite antenna on the Earth may be determined by the following steps. The satellite is used as a vertex, and the straight line SE is used as an axis to make a cone. An angle between a generatrix of the cone and the axis is a lobe width of the satellite antenna, and an intersection of the cone and the Earth is a coverage area of the beam. In some embodiments, during a period of operation of the satellite, the beams directed to the same target coverage area are generated to provide communication services for the terminals in the target coverage area.

Embodiments of the present disclosure provide a satellite-based communication method, a satellite-based communication apparatus, and a storage medium, which improve communication quality of a satellite communication system.

FIG. 2 is a flowchart illustrating a satellite-based communication method according to an illustrative embodiment. The satellite-based communication method may be executed by the above-mentioned satellite. As shown in FIG. 2, the satellite-based communication method includes the following step 201 and step 202.

In step 201, operation information of a first satellite and location information of a target coverage area are obtained.

In step 202, parameters of an antenna of the first satellite are determined according to the operation information of the first satellite and the location information of the target coverage area. The parameters are configured to control the antenna to provide beams directed to the target coverage area.

In some embodiments, determining the parameters of the antenna of the first satellite according to the operation information of the first satellite and the location information of the target coverage area includes determining a direction of arrival of a signal sent by a device on ground located in the target coverage area; and determining the parameters of the antenna of the first satellite according to the operation information of the first satellite and the direction of arrival.

In some embodiments, the operation information of the first satellite includes at least one of a position of the first satellite relative to the ground, a moving speed of the first satellite, an orbit of the first satellite, a moving speed of the first satellite relative to a second satellite, or a position of the first satellite relative to the second satellite.

A target coverage area of the second satellite at least partially overlaps with a target coverage area of the first satellite, and the first satellite and the second satellite provide beams directed to the target coverage area at different moments.

In some embodiments, determining the direction of arrival of the signal sent by the device on the ground includes receiving a signal sent by the device on the ground; and determining the direction of arrival according to the received signal.

In some embodiments, determining the parameters of the antenna of the first satellite according to the operation information of the first satellite and the direction of arrival includes determining a change in an angle of the first satellite to the ground according to a moving speed of the first satellite and an orbit of the first satellite; and determining the parameters of the antenna of the first satellite according to the change in the angle of the first satellite to the ground and the direction of arrival.

In some embodiments, determining the direction of arrival of the signal sent by the device on the ground includes obtaining the direction of arrival from the second satellite.

In some embodiments, determining the parameters of the antenna of the first satellite according to the operation information of the first satellite and the direction of arrival includes determining the parameters of the antenna of the first satellite according to the moving speed of the first satellite relative to the second satellite, the position of the first satellite relative to the second satellite, and the direction of arrival.

In some embodiments, the target coverage area is a coverage area corresponding to an orbit sub-interval where the first satellite is located; or the target coverage area is a coverage area corresponding to a sub-interval of an operation cycle where the first satellite is located.

In some embodiments, the satellite-based communication method further includes communicating with terminals within the target coverage area with the beams using different resources.

In some embodiments, the resources include at least one of a time domain resource, an air domain resource or a code domain resource.

It is noted that the above-mentioned steps 201 to 202 and the above-mentioned further steps may be combined.

FIG. 3 is a flowchart illustrating a satellite-based communication method according to an illustrative embodiment. The satellite-based communication method may be executed by a terminal. As shown in FIG. 3, the satellite-based communication method includes the following step 301 to step 302.

In step 301, service beams in an area where a terminal is located are determined. The service beams are provided by at least one satellite, and different satellites provide service beams directed to the area in different time periods.

In step 302, the satellite is communicated by using the service beams.

In some embodiments, determining the service beams in the area where the terminal is located includes determining the service beams in the area where the terminal is located according to a correspondence between the areas and the beams.

In some embodiments, the satellite-based communication method further includes determining a service satellite providing the service beams based on time.

In some embodiments, the satellite-based communication method further includes obtaining communication parameters of the service satellite; and performing communication by using the communication parameters.

It is noted that the above-mentioned steps 301 to 302 and the above-mentioned further steps may be combined.

FIG. 4 is a flowchart illustrating a satellite-based communication method according to an illustrative embodiment. The satellite-based communication method may be executed by satellites and terminals together. As shown in FIG. 4, the satellite-based communication method includes the following step 401 to step 405.

In step 401, a first satellite obtains operation information of the first satellite and location information of a target coverage area.

In some embodiments, the operation information of the first satellite includes at least one of a position of the first satellite relative to the ground, a moving speed of the first satellite, an orbit of the first satellite, a moving speed of the first satellite relative to a second satellite, or a position of the first satellite relative to the second satellite. A target coverage area of the second satellite at least partially overlaps with a target coverage area of the first satellite.

The position of the first satellite relative to the ground may be expressed by an orbital altitude, an orbital longitude and an orbital latitude, and stored in a storage device of the first satellite in advance. The moving speed of the first satellite may also be stored in the storage device of the first satellite in advance.

One or more second satellites may be provided. A relative speed and a relative position of the first satellite relative to the second satellite may be calculated according to the moving speed and the orbit of the first satellite and the moving speed and the orbit of the second satellite. The first satellite may obtain the orbit, the moving speed or other information of the second satellite through inter-satellite communication.

In some embodiments, one satellite provides coverage for the same target coverage area. In some embodiments, a plurality of satellites provide coverage for the same target coverage area, and different satellites may provide coverage for the target coverage area in different time periods. For example, the first satellite and the second satellite provide the beams directed to the target coverage area in different time periods.

In some embodiments, the target coverage area is a coverage area corresponding to an orbit sub-interval where the first satellite is located.

In this case, the first satellite stores a correspondence between the orbit sub-intervals of the orbit of the first satellite and the position information of the coverage area. Accordingly, the location information of the target coverage area may be obtained by the following steps.

The location information of the coverage area corresponding to the orbit sub-interval where the first satellite is located is obtained according to the correspondence between the orbit sub-intervals of the orbit of the first satellite and the location information of the coverage area, so as to obtain the location information of the target coverage area.

In some embodiments, the correspondence between the orbit sub-intervals of the orbit of the first satellite and the position information of the coverage area may be a combination of a correspondence between orbit sub-interval identifiers and identifiers of the coverage area, and a correspondence between the identifiers of the coverage area and the location information of the coverage area; or a correspondence between the orbit sub-interval identifiers and the location information of the coverage area.

The orbit of the first satellite may be divided into a plurality of orbit sub-intervals, and each orbit sub-interval has an identifier, such as a numeral. At least some of the orbit sub-intervals correspond to the coverage area, each orbit sub-interval corresponds to at least one coverage area, and each coverage area corresponds to one beam of the first satellite. That is, the first satellite may determine the number of the beams to be emitted and the coverage area directed to by each beam according to the orbit sub-interval where the first satellite is located.

In some embodiments, the target coverage area is a coverage area corresponding to a sub-interval of an operation cycle where the first satellite is located.

In this case, the first satellite stores the correspondence between the sub-intervals of the operation cycle of the first satellite and the location information of the coverage area. Accordingly, the location information of the target coverage area may be obtained in the following steps.

Location information of a coverage area corresponding to a sub-interval where the first satellite is located is obtained as the location information of the target coverage area according to the correspondence between the sub-intervals of the operation cycle of the first satellite and the location information of the coverage area.

In some embodiments, the correspondence between the sub-intervals of the operation cycle of the first satellite and the location information of the coverage area may be a combination of a correspondence between sub-interval identifiers of the operation cycle and the identifiers of the coverage area, and a correspondence between the identifiers of the coverage area and the location information of the coverage area; or a correspondence between the sub-interval identifiers of the operation cycle and the location information of the coverage area.

The operation cycle of the first satellite may be divided into a plurality of sub-intervals, and each sub-interval of the operation cycle has an identifier, such as a numeral. At least some of the sub-intervals of the operation cycle correspond to the coverage area, each sub-interval of the operation cycle corresponds to at least one coverage area, and each coverage area corresponds to one beam of the first satellite. That is, the first satellite may determine the number of the beams to be emitted and the coverage area directed to by each beam according to the sub-interval of the operation cycle where the first satellite is located.

In some embodiments, since each orbit sub-interval or each sub-interval of the operation cycle corresponds to one coverage area, when the satellite operates in the orbit sub-interval or the sub-interval of the operation cycle, the position directed to by the beam is generally constant. That is, the coverage area of the beam on the ground is substantially unchanged, such that more stable communication services may be provided for the terminals within the coverage area.

In step 402, the first satellite determines a direction of arrival of signal sent by a device on ground located in the target coverage area.

In each target coverage area, a plurality of devices (also known as anchors) on the ground may be deployed to transmit signals to the satellites through the anchors. The device on the ground may be a station on the ground, a mobile terminal, or other devices.

It is noted that the first satellite may receive signals sent by the plurality of the devices on the ground. After receiving the signals sent by the plurality of the devices on the ground, the first satellite may select the received signals according to a location where each device on the ground is located and the location information of the target coverage area, so as to determine the signals sent by the device on the ground in the target coverage area. The location of the device on the ground may be obtained by analyzing the signal sent by the device on the ground.

In some embodiments, the step 402 includes receiving the signal sent by the device on the ground by the first satellite; and determining the direction of arrival according to the received signal.

In some embodiments of the present disclosure, the direction of arrival may be determined through any algorithm, such as ESPRIT algorithm, MUSIC algorithm and so on, which is not limited herein.

In some embodiments, the step 402 includes obtaining the direction of arrival by the first satellite from the second satellite. The second satellite may be a satellite that provides coverage for the target coverage area in a time period before the first satellite. In this way, the first satellite may obtain the direction of arrival of the signal without interacting with the device on the ground.

In some embodiments, the first satellite and the second satellite may be satellites in the same orbital plane or satellites in different orbital planes.

In step 403, the first satellite determines parameters of an antenna of the first satellite according to the operation information of the first satellite and the direction of arrival.

Since the first satellite is constantly moving, and there is a certain delay between the received signal and the transmitted beam, the first satellite needs to correct the direction of arrival according to the operation information of the first satellite, and determines the parameters of the antenna of the first satellite according to the corrected direction of arrival. The parameters are used to control the antenna to provide beams directed to the target coverage area.

Here, the parameters of the antenna of the first satellite are beamforming parameters. By determining the beamforming parameters according to the corrected direction of arrival, when the first satellite operates for a period of time, the beams may direct to the target coverage area to provide communication services for the terminals in the target coverage area.

In some embodiments, the step 403 includes determining a change in an angle of the first satellite to the ground according to the moving speed of the first satellite and the orbit of the first satellite; and determining the parameters of the antenna of the first satellite according to the change in the angle of the first satellite to the ground and the direction of arrival. That is, the direction of arrival is corrected with the change in the angle to the ground. For example, the corrected direction of arrival may be a sum of the change in the angle to the ground and an angle corresponding to the direction of arrival before the correction.

In some embodiments, the change in the angle to the ground is a movement angle of the first satellite relative to the Earth. The change in the angle to the ground may be calculated as follows.

A moving distance of the first satellite in the orbit of the first satellite is obtained through multiplying the moving speed of the first satellite by a preset duration. The change in the angle to the ground is calculated according to the moving distance and a moving direction of the first satellite.

The above-mentioned correction process is described below by taking a satellite coordinate system as an example as follows. The satellite coordinate system is based on a satellite centroid as an origin O. A direction of the satellite centroid pointing to the Earth center is a positive direction of a Z-axis, and a moving direction of the satellite is a positive direction of an X-axis. A Y-axis is determined according to the right-hand rule in combination with the Z-axis and the X-axis.

Assuming that OP is the direction of arrival of the signal determined by the first satellite, a pitch angle corresponding the direction of arrival is a complementary angle of an angle (En) between OP and the Z-axis, and an azimuth angle corresponding to the direction of arrival is an included angle Av between a projection of OP on the XOY plane and the X-axis.

The moving distance of the first satellite may be calculated according to the moving speed and the preset duration of the first satellite (a product of the moving speed and the preset duration). The change in the angle corresponding to the moving distance is the change in the angle to the ground, and the moving direction may determine whether the change in the angle is positive or negative. Here, the preset duration may be determined according to a timing interval between the reception and the transmission, and may be stored in the storage device of the first satellite in advance.

In the above-mentioned satellite coordinate system, the direction of the Z-axis will change after the first satellite moves, and thus the pitch angle corresponding to the corrected DOA will change, for example, 90−En+Δθ, where Δθ is a corresponding offset angle of the Z-axis when the first satellite moves V*T. The azimuth angle corresponding to the corrected DOA remains unchanged and is still Av.

In some embodiments, the step 403 includes determining the parameters of the antenna of the first satellite according to the moving speed of the first satellite relative to the second satellite, the position of the first satellite relative to the second satellite, and the direction of arrival.

In some embodiments, determining the parameters of the antenna of the first satellite according to the moving speed of the first satellite relative to the second satellite, the position of the first satellite relative to the second satellite, and the direction of arrival includes determining a relative displacement of the first satellite relative to the second satellite in a first time period according to the moving speed of the first satellite relative to the second satellite and the position of the first satellite relative to the second satellite;

determining a first angle change according to the relative displacement; determining a change in an angle of the first satellite to the ground in a second time period, that is, a second angle change, according to the moving speed of the first satellite and the orbit of the first satellite; and determining the parameters of the antenna of the first satellite according to the first angle change, the second angle change and the direction of arrival.

The first time period is a time period from a moment of receiving by the second satellite the signal sent by the device on the ground to determine and send the DOA to a moment of receiving by the first satellite the DOA sent by the second satellite (hereinafter referred to as the first time period for short). Since both the first satellite and the second satellite are moving during the first time period, after obtaining the direction of arrival from the second satellite, there is a need to correct the received direction of arrival according to the relative speed and the relative position between the first satellite and the second satellite.

In some embodiments, determining the first angle change according to the relative displacement includes determining a position where the second satellite receives the signal sent by the device on the ground according to the relative displacement and the position of the first satellite relative to the second satellite; determining a position deviation between a position where the first satellite receives the DOA sent by the second satellite and the position where the second satellite receives the signal sent by the device on the ground; and determining the first angle change according to the position deviation.

In addition, the second time period is a time period from a moment of receiving by the first satellite the DOA sent by the second satellite to a moment of emitting the beam by the first satellite. Since the first satellite is still moving during the second time period, there is a need to correct the direction of arrival according to movement information of the first satellite in the second time period.

Determining the parameters of the antenna of the first satellite according to the first angle change, the second angle change and the direction of arrival includes correcting at least one of the azimuth angle or the pitch angle corresponding to the direction of arrival with the first angle change and the second angle change.

The durations of the first time period and the second time period may be determined according to a timing interval between the signal reception and the signal transmission of the satellite.

It is noted that the above-mentioned correction process of the DOA is only taken as an example. In embodiments of the present disclosure, the direction of arrival may be corrected with the movement information of the first satellite in any appropriate manner, as long as the beam directed to the target coverage area may be generated according to the parameters determined according to the corrected DOA.

In some embodiments, after emitting the beam, the satellite-based communication method may further include communicating with terminals within the target coverage area with the emitted beams using different resources.

In some embodiments, the resources include at least one of a time domain resource, an air domain resource, or a code domain resource.

The air domain resource is suitable for an uplink transmission. Since a width of the beam used by the terminal is relatively narrow compared with a width of the beam provided by the satellite, different terminals may send signals to the satellite through the beams with different spatial orientations during the uplink transmission. That is, different air domain resources are used to send signals to the satellite. The time domain resource and the code domain resource are applicable to both uplink and downlink transmission.

In step 404, service beams in an area where a terminal is located are determined.

Since the orbit of the satellite is fixed, the satellite passing through a certain location may be determined. The beam provided by the satellite passing through the location may be used as the service beam, and the beams providing coverage for the location may be assigned with the same identifier, such that the terminal may perform communication without knowing which satellite is providing the beam, which simplifies the communication process of the terminal.

The terminal may obtain the correspondence between the areas and the satellites in advance, and determine the service beam according to the satellite corresponding to the area where the terminal is located.

In step 405, the terminal uses the service beams to communicate with the satellite.

One beam may provide communication services for a plurality of terminals in the coverage area. Different terminals may be distinguished by different resources. Here, the resources include, but are not limited to, at least one of the time domain resources, the air domain resources, or the code domain resources.

In addition, since the moving speed and the operation track of the satellite are fixed, the time when the beam provided by the satellite covers the area may be determined according to the moving speed of the satellite. Therefore, the satellite-based communication method may further include determining a service satellite providing the service beams based on the time.

In some embodiments, the satellite-based communication method may further include obtaining the communication parameters of the service satellite; and performing communication by using the communication parameters. Since different satellites may use different parameters when providing communication services, in order to further improve the performance of the communication system, the corresponding communication parameters of the service satellite may be used for communication. Here, the communication parameters include, but are not limited to, frequency points and so on.

In embodiments of the present disclosure, the beam emitted by the antenna of the first satellite may be controlled according to the operation information of the first satellite and the location information of the target coverage area, such that the beams point to the same target coverage area in a period of time during the operation of the first satellite. In this way, the terminals in the target coverage area may stably perform communication without switching the beams, thus improving the communication quality of the terminals.

In addition, in embodiments of the present disclosure, the direction of arrival of the signal may be corrected according to the operation information, and the direction of the beams of the antenna may be controlled according to the corrected signal, which further ensures that the beams of the first satellite may point to the same target coverage area in a period of time.

FIG. 5 is a schematic diagram illustrating a satellite-based communication apparatus according to an illustrative embodiment. The apparatus has the function of implementing the satellite in the above-mentioned method embodiments. The function may be realized by hardware or by executing corresponding software with hardware. As shown in FIG. 5, the satellite-based communication apparatus includes an obtaining module 501 and a determining module 502.

The obtaining module 501 is configured to obtain operation information of a first satellite and location information of a target coverage area.

The determining module 502 is configured to determine parameters of an antenna of the first satellite according to the operation information of the first satellite and the location information of the target coverage area. The parameters are configured to control the antenna to provide beams directed to the target coverage area.

In some embodiments, the determining module 502 is configured to determine a direction of arrival of a signal sent by a device on ground located in the target coverage area; and determine the parameters of the antenna of the first satellite according to the operation information of the first satellite and the direction of arrival.

In some embodiments, the operation information of the first satellite includes at least one of a position of the first satellite relative to the ground, a moving speed of the first satellite, an orbit of the first satellite, a moving speed of the first satellite relative to a second satellite, and a position of the first satellite relative to the second satellite.

A target coverage area of the second satellite at least partially overlaps with a target coverage area of the first satellite, and the first satellite and the second satellite provide beams directed to the target coverage area at different moments.

In some embodiments, the determining module 502 is configured to receive a signal sent by the device on the ground; and determine the direction of arrival according to the received signal.

In some embodiments, the determining module 502 is configured to determine a change in an angle of the first satellite to the ground according to a moving speed of the first satellite and an orbit of the first satellite; and determine the parameters of the antenna of the first satellite according to the change in the angle of the first satellite to the ground and the direction of arrival.

In some embodiments, the determining module 502 is configured to obtain the direction of arrival from the second satellite.

In some embodiments, the determining module 502 is configured to determine the parameters of the antenna of the first satellite according to the moving speed of the first satellite relative to the second satellite, the position of the first satellite relative to the second satellite, and the direction of arrival.

In some embodiments, the target coverage area is a coverage area corresponding to an orbit sub-interval where the first satellite is located; or the target coverage area is a coverage area corresponding to a sub-interval of an operation cycle where the first satellite is located.

In some embodiments, the satellite-based communication apparatus further includes a communication module 503 configured to communicate with terminals within the target coverage area with the beams using different resources.

In some embodiments, the resources include at least one of a time domain resource, an air domain resource, or a code domain resource.

FIG. 6 is a schematic diagram illustrating a satellite-based communication apparatus according to an illustrative embodiment. The apparatus has the function of implementing the satellite in the above-mentioned method embodiments. The function may be realized by hardware or by executing corresponding software with hardware. As shown in FIG. 6, the satellite-based communication apparatus includes a determining module 601 and a communication module 602.

The determining module 601 is configured to determine service beams in an area where a terminal is located. The service beams are provided by at least one satellite, and different satellites provide service beams directed to the area in different time periods. The communication module 602 is configured to communicate with the satellite by using the service beams.

In some embodiments, the determining module 601 is further configured to determine the service beams in the area where the terminal is located according to the correspondence between the areas and the beams.

In some embodiments, the determining module 601 is further configured to determine a service satellite providing the service beams based on time.

In some embodiments, the satellite-based communication apparatus further includes an obtaining module 603 configured to obtain communication parameters of the service satellite. The communication module 602 is configured to perform communication by using the communication parameters.

The antenna of the satellite is controlled according to the operation information of the first satellite and the position information of the target coverage area, such that the beams emitted by the antenna are directed to the target coverage area within a period of time. In this way, the terminals in the target coverage area may perform communication through one or more identical beams in a period of time without frequently switching beams, which improves the communication quality.

Figure 7:
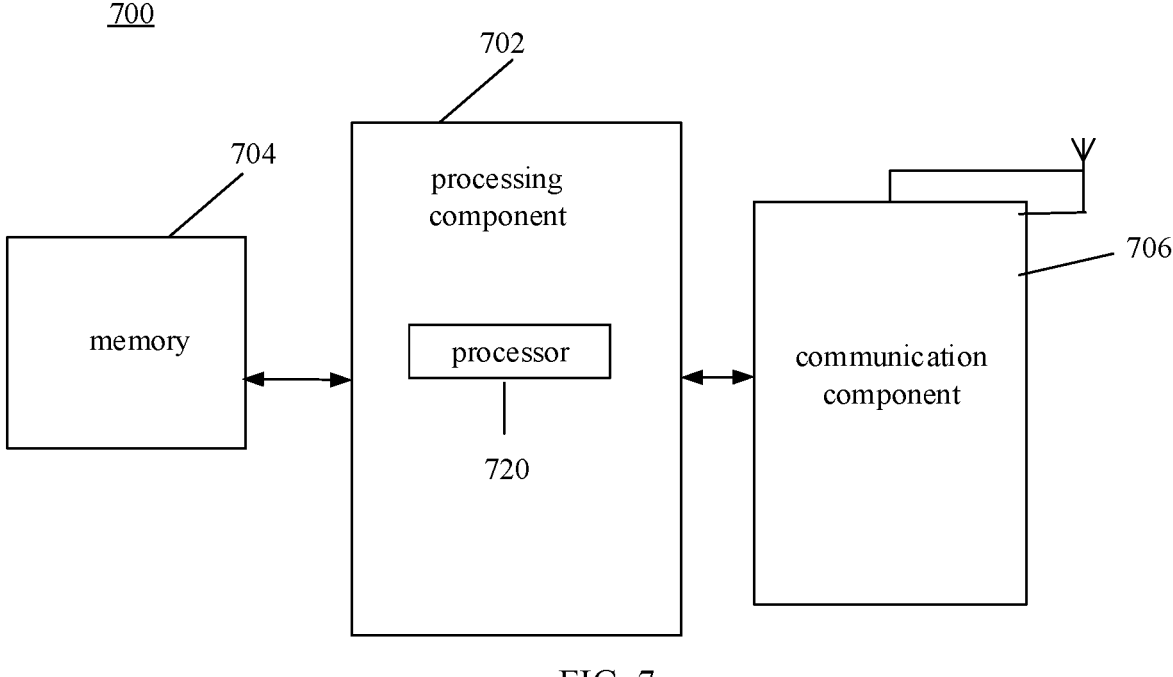
FIG. 7 is a block diagram illustrating a satellite-based communication apparatus such as a satellite, according to an illustrative embodiment.

FIG. 7 is a block diagram illustrating a satellite-based communication apparatus 700 according to an illustrative embodiment. The apparatus 700 may be the above-mentioned satellite. As shown in FIG. 7, the satellite-based communication apparatus 700 may include one or more of a processing component 702, a memory 704 and a communication component 706.

The processing component 702 generally controls an overall operation of the satellite-based communication apparatus 700, such as operations associated with display, telephone calls, data communication, camera operations, and recording operations. The processing component 702 may include one or more processors 720 to execute instructions to perform all or some of steps in the above-mentioned method. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data to support the operation of the satellite-based communication apparatus 700. The memory 704 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The communication component 706 is configured to facilitate wireless communication between an access network device and other devices. In some embodiments, the communication component 716 may provide a wireless network based on a communication standard, such as 2G, 3G, 4G, 5G, 6G, or a combination thereof, to connect with a terminal device.

In an illustrative embodiment, there is also provided a non-transitory computer-readable storage medium having stored therein instructions, such as a memory 704 including instructions, which may be executed by the processor 720 of the satellite-based communication apparatus 700 to implement the above-mentioned satellite-based communication method. For example, the non-transitory computer readable storage medium may be a ROM, a random access memory (RAM), a CD-ROM, a magnetic tape, a floppy disc, an optical data storage device or the like.

Figure 8:
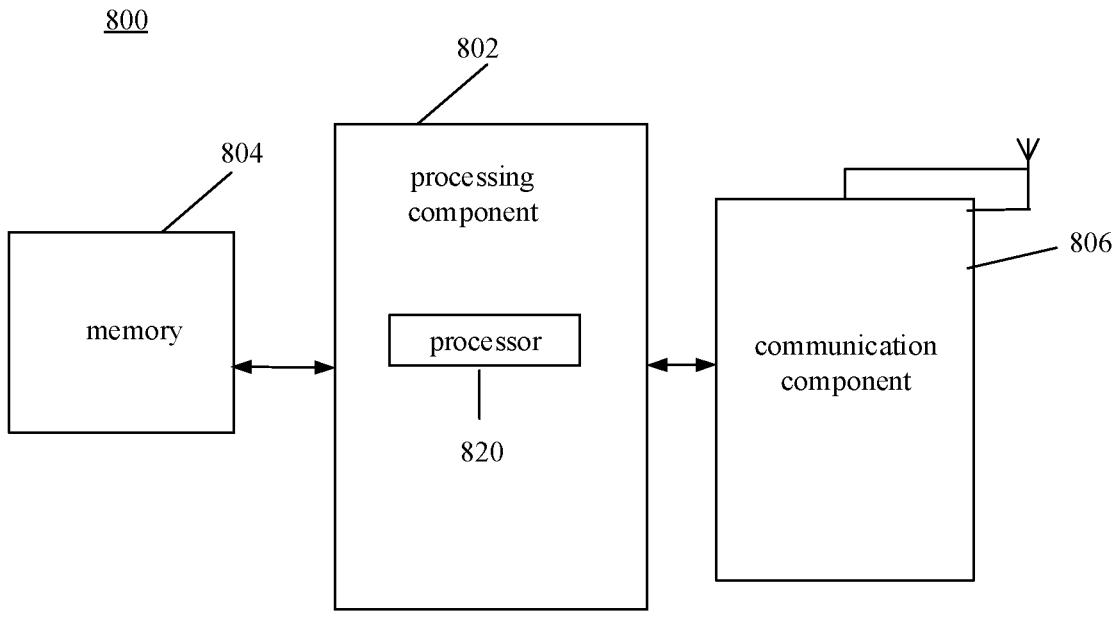
FIG. 8 is a block diagram illustrating a satellite-based communication apparatus such as a terminal, according to another illustrative embodiment.

FIG. 8 is a block diagram illustrating a satellite-based communication apparatus 800 according to an illustrative embodiment. The satellite-based communication apparatus 800 may be the above-mentioned terminal. As shown in FIG. 8, the satellite-based communication apparatus 800 may include one or more of a processing component 802, a memory 804 and a communication component 806.

The processing component 802 generally controls an overall operation of the satellite-based communication apparatus 800, such as operations associated with display, telephone calls, data communication, camera operations, and recording operations. The processing component 802 may include one or more processors 820 to execute instructions to perform all or some of steps in the above-mentioned method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the satellite-based communication apparatus 800. Examples of such data include instructions, contact data, phonebook data, messages, pictures, videos, and the like for any application or method operating on the satellite-based communication apparatus 800. The memory 804 may be implemented by any type of volatile or non-volatile storage device or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

The communication component 806 is configured to facilitate wireless communication between the satellite-based communication apparatus 800 and other devices. In some embodiments, the communication component 816 may provide a wireless network based on a communication standard, such as 2G, 3G, 4G, 5G, 6G, or a combination thereof, to realize random access. In an illustrative embodiment, the communication component 816 receives a broadcast signal or broadcast related information from an external broadcast management system via a broadcast channel.

In an illustrative embodiment, there is also provided a non-transitory computer-readable storage medium having stored therein instructions, such as a memory 804 including instructions, which may be executed by the processor 820 of the satellite-based communication apparatus 800 to implement the above-mentioned satellite-based communication method. For example, the non-transitory computer readable storage medium may be a ROM, a random access memory (RAM), a CD-ROM, a magnetic tape, a floppy disc, an optical data storage device or the like.

An illustrative embodiment of the present disclosure further provides a communication system, which includes a satellite and a terminal. The satellite is the satellite-based communication apparatus according to the embodiment shown in FIG. 7, and the terminal is the satellite-based communication apparatus according to the embodiment shown in FIG. 8.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes may be made without departing from the scope thereof. It is intended that the scope of the embodiments of the present disclosure only be limited by the appended claims.

What is claimed is:

1. A satellite-based communication method, performed by a first satellite, comprising:

obtaining operation information of the first satellite and location information of a target coverage area of the first satellite;

determining a direction of arrival of a signal sent by a device on ground located in the target coverage area of the first satellite;

determining parameters of an antenna of the first satellite according to the operation information of the first satellite and the direction of arrival, wherein the parameters are configured to control the antenna to provide beams directed to the target coverage area;

communicating with terminals within the target coverage area with the beams;

wherein determining the direction of arrival of the signal sent by the device on ground located in the target coverage area of the first satellite comprises:

obtaining the direction of arrival of the signal sent by the device on ground located in the target coverage area of the first satellite from a second satellite; wherein a target coverage area of the second satellite at least partially overlaps with the target coverage area of the first satellite, and the first satellite and the second satellite provide beams directed to the target coverage area of the first satellite at different moments;

wherein determining the parameters of the antenna of the first satellite according to the operation information of the first satellite and the direction of arrival comprises:

determining a relative displacement of the first satellite relative to the second satellite in a first time period according to a moving speed of the first satellite relative to the second satellite and a position of the first satellite relative to the second satellite, wherein the first time period is a time period from a moment of receiving by the second satellite the signal sent by the device on ground to determine and send the direction of arrival to a moment of receiving by the first satellite the direction of arrival sent by the second satellite;

determining a first angle change according to the relative displacement;

determining a second angle change in an angle of the first satellite to the ground in a second time period according to the moving speed of the first satellite and an orbit of the first satellite, wherein the second time period is a time period from a moment of receiving by the first satellite the direction of arrival sent by the second satellite to a moment of emitting the beams by the first satellite; and determining the parameters of the antenna of the first satellite according to the first angle change, the second angle change and the direction of arrival.

2. The method according to claim 1, wherein the target coverage area is a coverage area corresponding to an orbit sub-interval where the first satellite is located; or the target coverage area is a coverage area corresponding to a sub-interval of an operation cycle where the first satellite is located.

3. The method according to claim 1, further comprising:

communicating with terminals within the target coverage area with the beams using different resources.

4. The method according to claim 3, wherein the resources comprise at least one of a time domain resource, an air domain resource or a code domain resource.

5. A satellite-based communication method, performed by a terminal comprising:

determining service beams in an area where the terminal is located, wherein the service beams are provided by at least one satellite, and different satellites provide service beams directed to the area in different time periods;

communicating with the satellite by using the service beams;

wherein the service beams are provided by a first satellite of the at least one satellite via: obtaining the direction of arrival of the signal sent by the device on ground located in the target coverage area of the first satellite from a second satellite; wherein a target coverage area of the second satellite at least partially overlaps with the target coverage area of the first satellite, and the first satellite and the second satellite provide beams directed to the target coverage area of the first satellite at different moments; determining parameters of an antenna of the first satellite according to the operation information of the first satellite and the direction of arrival;

wherein determining the parameters of the antenna of the first satellite according to the operation information of the first satellite and the direction of arrival comprises:

determining a relative displacement of the first satellite relative to the second satellite in a first time period according to a moving speed of the first satellite relative to the second satellite and a position of the first satellite relative to the second satellite, wherein the first time period is a time period from a moment of receiving by the second satellite the signal sent by the device on ground to determine and send the direction of arrival to a moment of receiving by the first satellite the direction of arrival sent by the second satellite;

determining a first angle change according to the relative displacement;

determining a second angle change in an angle of the first satellite to the ground in a second time period according to the moving speed of the first satellite and an orbit of the first satellite, wherein the second time period is a time period from a moment of receiving by the first satellite the direction of arrival sent by the second satellite to a moment of emitting the beams by the first satellite; and determining the parameters of the antenna of the first satellite according to the first angle change, the second angle change and the direction of arrival.

6. The method according to claim 5, wherein determining the service beams in the area where the terminal is located further comprises:

determining the service beams in the area where the terminal is located according to a correspondence between the areas and the beams.

7. The method according to claim 5, further comprising:
determining a service satellite providing the service beams based on time.

8. The method according to claim 7, further comprising:
obtaining communication parameters of the service satellite;

performing communication by using the communication parameters.

9. A satellite-based communication apparatus, comprising:

a processor;

a memory for storing instructions executable by the processor;

wherein the processor is configured to:

obtain operation information of a first satellite and location information of a target coverage area of a first satellite;

determine a direction of arrival of a signal sent by a device on ground located in the target coverage area of the first satellite;

determine parameters of an antenna of the first satellite according to the operation information of the first satellite and the direction of arrival, wherein the parameters are configured to control the antenna to provide beams directed to the target coverage area;

communicate with terminals within the target coverage area with the beams;

wherein determine the direction of arrival of the signal sent by the device on ground located in the target coverage area of the first satellite comprises:

obtain the direction of arrival of the signal sent by the device on ground located in the target coverage area of the first satellite from a second satellite; wherein a target coverage area of the second satellite at least partially overlaps with the target coverage area of the first satellite, and the first satellite and the second satellite provide beams directed to the target coverage area of the first satellite at different moments;

wherein determine the parameters of the antenna of the first satellite according to the operation information of the first satellite and the direction of arrival comprises:

determining a relative displacement of the first satellite relative to the second satellite in a first time period according to a moving speed of the first satellite relative to the second satellite and a position of the first satellite relative to the second satellite, wherein the first time period is a time period from a moment of receiving by the second satellite the signal sent by the device on ground to determine and send the direction of arrival to a moment of receiving by the first satellite the direction of arrival sent by the second satellite;

determining a first angle change according to the relative displacement;

determining a second angle change in an angle of the first satellite to the ground in a second time period according to the moving speed of the first satellite and an orbit of the first satellite, wherein the second time period is a time period from a moment of receiving by the first satellite the direction of arrival sent by the second satellite to a moment of emitting the beams by the first satellite; and determining the parameters of the antenna of the first satellite according to the first angle change, the second angle change and the direction of arrival.

10. A computer-readable storage medium having stored therein instructions that, when executed by a processor, cause the processor to perform the satellite-based communication method according to claim 1.

* * * * *